United States Patent [19]

McCready

[11] 3,947,403
[45] Mar. 30, 1976

[54] POLYURETHANE POLYVINYLIDENE CHLORIDE COMPOSITION

[75] Inventor: John E. McCready, Tallmadge, Ohio

[73] Assignee: The Goodyear Tire & Rubber Company, Akron, Ohio

[22] Filed: Aug. 17, 1970

[21] Appl. No.: 64,645

Related U.S. Application Data

[63] Continuation of Ser. No. 671,982, Oct. 2, 1967, abandoned.

[52] U.S. Cl. ... 260/32.8 N; 260/32.4; 260/33.6 UB; 260/859 R
[51] Int. Cl.² ......................................... C08L 75/06
[58] Field of Search..... 260/859 R, 859 PV, 32.8 R, 260/32.8 N, 33.6 UB

[56] References Cited
UNITED STATES PATENTS
3,357,939  12/1967  Reischl............................ 260/859 R
3,444,266  5/1969  Reischl......................... 260/859 PV

OTHER PUBLICATIONS

Solomon, "The Chemistry of Organic Film–Formers," John Wiley & Sons, 1967, p. 205.

Skeist, "Handbook of Adhesives," 1962, Reinhold, Pub., pp. 344, 345, 336–339, 436, 437.

*Primary Examiner*—Paul R. Michl
*Attorney, Agent, or Firm*—F. W. Brunner; J. D. Wolfe

[57] ABSTRACT

This invention relates to a composition of matter having an improved Scott brittle point comprising a mixture of a polyvinylidene chloride and a polyurethane formed by the reaction of a reactive hydrogen containing compound and sufficient organic polyisocyanate to give at least about 0.5 to about 10 percent by weight of free isocyanate and reacting to set the mixture.

2 Claims, No Drawings

POLYURETHANE POLYVINYLIDENE CHLORIDE COMPOSITION

This case is a continuation of Ser. No. 671,982 filed Oct. 2, 1967 and now abandoned.

This invention relates to a method of making an improved adhesive and to said adhesive. More particularly, this invention relates to an adhesive for adhering polyurethane gumstocks, cured polyurethanes and polyurethanes which are only partially cured to each other or to other substrates such as fabric, and other rubbers and polymers.

In the manufacture of laminated articles such as liquid containers, solid tires having metal hubs or fittings, and other assorted laminates utilizing polyurethanes in conjunction with another polyurethane or other metals or fabric, difficulty has been experienced in obtaining good adhesion.

It is an object of this invention to provide a new adhesive having good uncured tack or cohesive strength and a method of utilizing said adhesive which reduces the surface preparation required to obtain satisfactory adhesion or lamination.

In accordance with this invention an improved adhesive or cement is obtained by forming a solvent solution of polyurethane prepolymer and a polyvinylidene chloride and then this solution may be utilized to adhere a polyurethane, a polyurethane prepolymer or partially cured polyurethane to each other or to other suitable substrates by cleaning the substrate with a suitable solvent to remove any grease, then brushing, painting, coating, dipping or otherwise applying a coat of the solution of polyurethane and polyvinylidene chloride to the surfaces to be adhered and placing them in contact until the adhesive has had time to set and cure. Usually the polyurethane prepolymer will be present in about 50 to 125 parts by weight and the polyvinylidene chloride will be present in about 5 to 25 parts by weight for each hundred parts of the solvent. Representative of the many solvents that may be used are the aromatic and cycloaliphatic hydrocarbons, the ketones, the liquid esters, nitroparaffins and other resinous solvents normally utilized in paint making.

Representative of the many polyurethane propolymers that may be utilized are those formed by reacting a reactive hydrogen containing material having a molecular weight preferably of about 300 to 6000 to form a reaction product containing from about a half to 10 and preferably 3 to 6 percent by weight of free NCO groups. A small amount of crosslinking agents may be utilized where desired, so long as the resulting prepolymer has free NCO.

The nature of this invention is further exemplified in the examples where the parts are by weight unless otherwise designated.

EXAMPLE I

A prepolymer was formed by the reaction of 6 moles of toluene diisocyanate with 2 moles of 80/20 ethylene propylene adipate of about 2000–3000 molecular weight, and 1 mole of 1,4-butane diol adipate of about 2000–3000 molecular weight. This prepolymer was taken up in methyl ethyl ketone in order to adjust to a desired application viscosity.

The curative, methylene bis orthochloroaniline, was also dissolved in methylethyl ketone for room temperature handling and viscosity reasons.

One hundred parts of the prepolymer in solution was combined with ten parts of the curative in solution and applied to nylon fabric. The sample thus prepared was allowed to react in order to provide a test construction of a cured polyurethane coated fabric. Adhesion test strips one inch wide and eight inches long were cut from the cured polyurethane coated fabric and cleaned with methylethyl ketone prior to being coated with the cement. A number of adhesive cements were made from the above polyurethane prepolymer solution by mixing 100 parts of the prepolymer with varying amounts of polyvinylidene chloride. Solutions were further adjusted with MEK to a proper application consistency, where MEK indicates methyl ethyl ketone.

The curative, methylene bis orthochloroaniline, solution was then added in a ratio of 10 parts curative to 100 parts prepolymer in each adhesive cement. A coating of each experimental adhesive was applied to the test strips. Adhesion peel samples were prepared by joining similarly coated strips in accordance with Table 1. The sample laminates were pulled apart at the rate of two inches per minute at about 75°F. and 160°F. with the angle of pull being 180°. The results of these pull or adhesion tests are shown in Table 1.

Table 1

| Polyvinylidene Chloride in Adhesive Parts | Number Brush Coats | Open Time Hours | Cure Temperature °F. | Adhesion Lbs./In. |
|---|---|---|---|---|
| 5 | 2 | 1 | 75 | 5 |
| 10 | 2 | 1 | 75 | 8 |
| 25 | 2 | 1 | 75 | 10 |
| 50 | 2 | 1 | 75 | 11 |
| 5 | 2 | 3 | 220 | 85 |
| 10 | 2 | 3 | 220 | 85 |
| 25 | 2 | 3 | 220 | 85 |
| 50 | 2 | 3 | 220 | 70 |
| 50 | 1 | 3 | 220 | 65 |
| 5 | 2 | 3 | 220 | 60+* |
| 10 | 2 | 3 | 220 | 60+* |
| 25 | 2 | 3 | 220 | 60+* |
| 25 | 1 | 3 | 220 | 55 * |

*Adhesion strength determined at 160°F.

EXAMPLE II

In the same manner as Example I, a series of test samples were prepared using varying parts of polyvinylidene chloride. A single brush coat of adhesive was applied. The samples stood one hour at room temperature (75°F.) before lamination. The laminated samples then cured at room temperature (75°F.) for the time shown in Table 2.

Table 2

| Parts Polyvinylidene Chloride in Cement | Adhesion, Lbs./In. | | |
|---|---|---|---|
| | 3 Days | 6 Days | 11 Days |
| 20 | 21 | 43 | |
| 25 | 24 | 34 | 70 |
| 35 | 18 | 44 | |
| 50 | 15 | 26 | 45 |

EXAMPLE III

This series of experiments were run to determine the tack life or open time of the cement. By open time is meant the time the cement has stood exposed to the atmosphere as under use conditions. The cement used comprised 125 parts of methyl ethyl ketone, 100 parts of the polyurethane prepared in Example I and 25 parts of polyvinylidene chloride. The cured adhesion and tack adhesion on samples prepared according to the method of Example I are shown in Table 3 using the cement after it has been exposed for the open time indicated.

Table 3

| Open Time Minutes | Tack | Adhesion Lbs./In. 21 Hrs. at 75°F. | 3 Hrs. at 220°F. |
|---|---|---|---|
| 15 | 3 | 14 | |
| 30 | 3.5 | 15 | 45 |
| 45 | 3.5 | 16 | 45 |
| 60 | 3.5 | 15 | |
| 75 | 3.5 | 15 | |
| 90 | 5 | 16 | 42 |
| 120 | 5 | 15 | 36 |
| 150 | 5 | 15 | |

EXAMPLE IV

A cement was made using the polyurethane prepolymer of Example I and an intermediate curative containing one part by weight of mercaptobenzothiazole for each 100 parts of polyester in addition to the methylene-bis-orthochloroaniline. This cement was formulated by mixing 100 parts of the polyurethane, 25 parts of polyvinylidene chloride and 125 parts of methyl ethyl ketone.

Table 4 shows open time for this cement and adhesion on laminates prepared according to the method of Example I for cure time at 75°F.

Table 4

| Open Time Minutes | Adhesion Lbs./In. for Cure Time in Hours * | | | | |
|---|---|---|---|---|---|
| | Tack | 19 | 43 | 72 | 96 |
| 15 | 2 | 16 | 20 | 28 | 40 |
| 30 | 2 | 16 | 24 | 35 | |
| 45 | 5 | 19 | 27 | 34 | 40 |
| 70 | 5 | 20 | 28 | 35 | |
| 90 | 5 | 17 | 21 | 28 | 35 |

* Cured at Room Temperature

Thus, this cement has good build tack, sufficient open time to build the desired articles, excellent adhesion and good handling properties.

EXAMPLE V

The polyurethane (100 parts) of Example I and 10 parts of polyvinylidene chloride were mixed to form a blend which was used to form a Scot brittle point test specimen. Also, two other blends were made using 100 parts of polyurethane of Example I and 25 and 50 parts respectively of polyvinylidene chloride and used to form Scot brittle point test specimen. Each of these blends had a Scot brittle point of −75°C.

EXAMPLE VI

A square woven nylon fabric of the 3602-N type was given two brush coatings of a cement and then the fabric was adhered to another square woven nylon fabric of the same type. After the cement had been allowed to dry approximately one hour, the two pieces of nylon were pressed together and the adhesion results for the cure time indicated are shown in Table 5. The cement was formed by mixing 25 parts of polyvinylidene chloride with 100 parts of a polyesterurethane dissolved in sufficient methyl ethyl ketone to permit the mixture to be brush coated.

Table 5

| Hours | Cure Conditions Temperature °F. | Lbs./In. Adhesion at Room Temperature |
|---|---|---|
| 16 | 75 | 27 |
| 48 | 75 | 43 |
| 3 | 220 | 45 |

The polyurethanes useful in this invention are prepared by reacting an organic polyisocyanate with a reactive hydrogen containing material of about 300 to 5000 molecular weight and preferably about 2000 to 3000 molecular weight to form a prepolymer having from about a half to ten percent free NCO content by weight.

Representative of the classes of the reactive hydrogen containing materials are the polyester polyols, polyether polyols and the hydrocarbon polyols.

Representative polyester polyols are those formed by reacting a polycarboxylic acid or its anhydride, for instance, adipic acid or azelaic acid with a polyol such as the glycol of ethylene, propylene or butylene.

Representative of the many polyether polyols are those formed by condensing an alkylene oxide of about 2 to 8 carbon atoms with a cogeneric monomer such as the glycols, trimethylol propane, pentaerythritol or the hexols. Specific representative members are the polypropylene ether polyols of 2,3,4,5 or 6 hydroxyls and polybutylene ether polyols of 2,3,4,5 or 6 hydroxyls.

Representative of the many organic polyisocyanates that may be used are those such as toluene diisocyanate, toluidine diisocyanate, methylene bis (phenyl isocyanate) and others such as those set forth in U.S. Pat. No. 2,764,565.

Although the examples have exemplified this invention with prepolymers, other polyurethane manufacturing methods, such as the one shot method may be used. For instance, a polypropylene ether glycol or polytetramethylene ether glycol or triol may be mixed simultaneously with the polyvinylidene chloride, the organic polyisocyanate and crosslinker, i.e., an organic diamine, glycol or monomeric polyol in a suitable solvent and this mixture may be used as an adhesive. Similarly, a hydrocarbon polyol, such as a polybutadiene polyol, polyisoprene diol or polystyrene butadiene polyol, may be used instead of the polyester or polyether polyol.

The polyurethane reaction mixture may also contain catalysts such as the organic tin compounds or tertiary amines. In fact, the curative, a crosslinker and if desired a catalyst, can be added in an amount sufficient to essentially react with all the free NCO groups where the loss in tensile strength is not harmful. Normally, sufficient crosslinker is used to react with about 99 to 90 percent of the free NCO groups, although in some instances, where the lower tensiles are tolerable, a 1 to 5 percent excess of crosslinker may be tolerated, especially when a catalyst such as mercaptobenzothiazole is present.

Representative crosslinkers are the diamines such as the aliphatic, cycloaliphatic or aromatic ones or the monomeric polyols, the glycols of 2 to 20 carbon atoms, the triols and tetrols of 3 to 20 carbon atoms and higher hydroxyl compounds.

Thus, this invention supplies a novel compositon having improved Scott brittle points and useful as adhesives for metals, fabric, polyurethane and other resins. This composition contains about 5 to 50 percent by weight of polyvinylidene chloride, preferably one soluble in methyl ethyl ketone to the extent of 5 to 35 parts per 100 parts at 75°F. and a polyurethane, and then the mixture is preferably reacted to set the polyurethane. Usually the better adhesive results are obtained when each 100 parts of the compositon is dissolved in 5 to 100 parts of a solvent for polyvinylidene chloride.

While certain representative embodiments and details have been shown for the purpose of illustrating the invention, it will be apparent to those skilled in this art that various changes and modifications may be made therein without departing from the spirit or scope of the invention.

What is claimed is:

1. An adhesive composition of matter having improved Scot brittle point comprising a mixture of 5 to 50 parts of a polyvinylidene chloride, which is soluble at 75°F. to the extent of 5 to about 35 parts per hundred parts of methyl ethyl ketone, per hundred parts of a prepolymer formed by the reaction of a polyester polyol of 300 to 6000 molecular weight with sufficient organic polyisocyanate selected from the class consisting of toluene diisocyanate, methylene bis(phenyl isocyanate) and tolidine diisocyanate to give at least about 0.5 to about 10 percent by weight of free isocyanate.

2. The adhesive composition of claim 1 wherein the composition contains about 5 to 100 parts of a solvent for polyvinylidene chloride and exhibits a tack strength of at least 2 pounds per inch when the adhesive composition is cured.

* * * * *